(No Model.) 2 Sheets—Sheet 1.
E. LIND.
CORNSTALK CUTTER.
No. 453,121. Patented May 26, 1891.
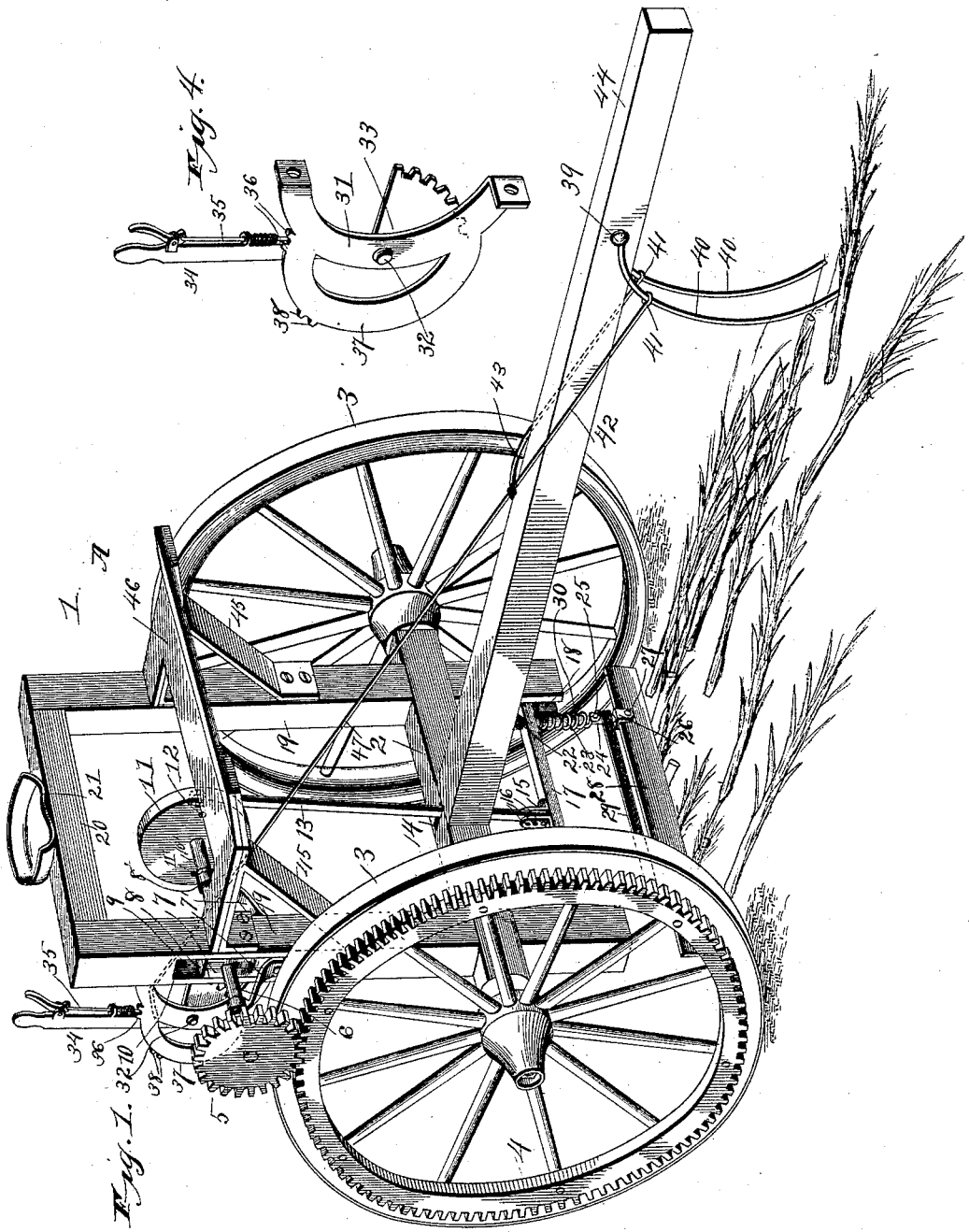
Witnesses
Geo. E. F. Lodge
H. E. Price
Inventor
Emile Lind.
By his Attorneys
Higdon & Higdon (No Model.) 2 Sheets—Sheet 2.
E. LIND.
CORNSTALK CUTTER.
No. 453,121. Patented May 26, 1891.
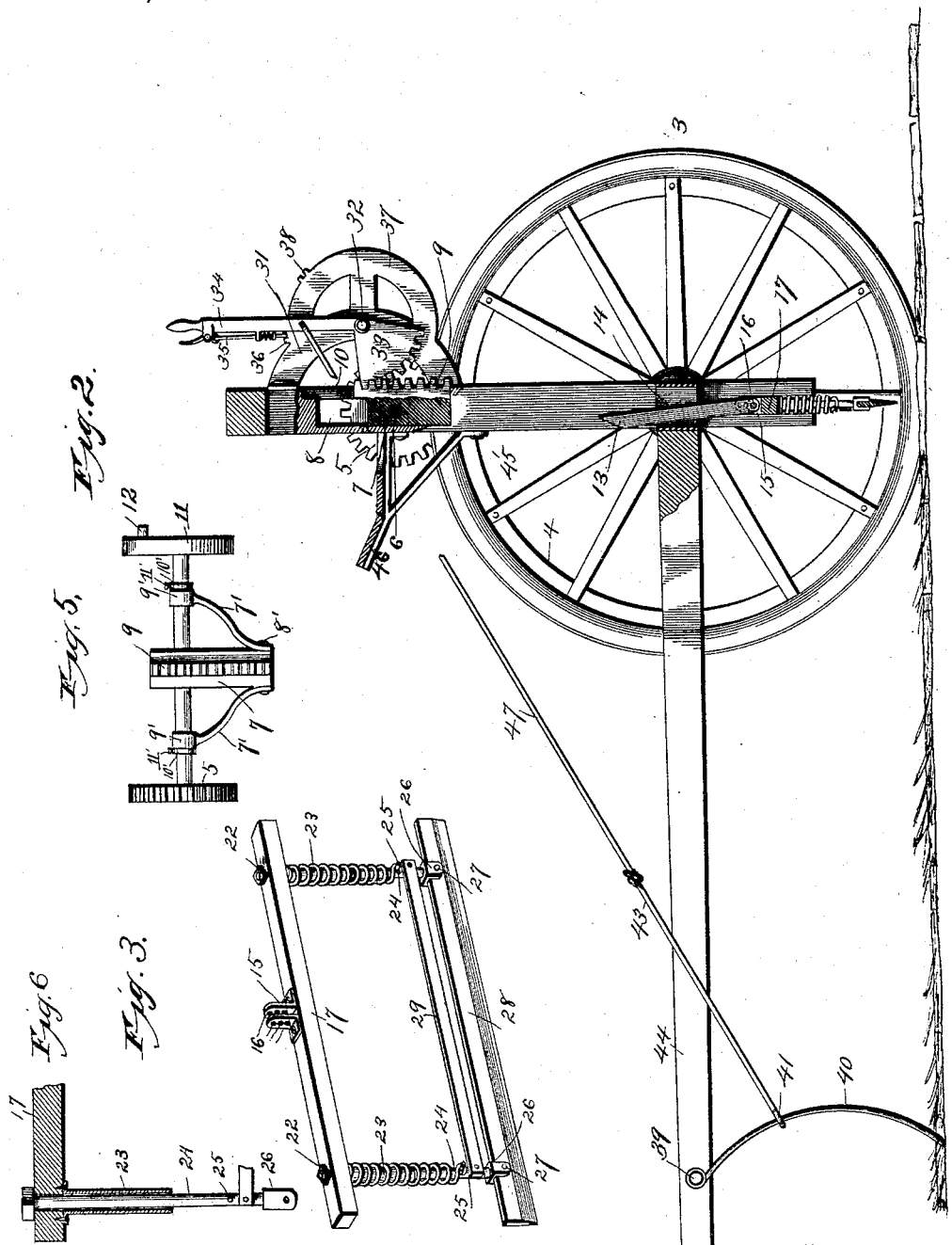
Witnesses
Geo. M. Thorpe
N. E. Price
Inventor
Emile Lind
By his Attorneys
Higdon & Higdon

UNITED STATES PATENT OFFICE.

EMILE LIND, OF KANSAS CITY, MISSOURI.

CORNSTALK-CUTTER.

SPECIFICATION forming part of Letters Patent No. 453,121, dated May 26, 1891.

Application filed January 19, 1891. Serial No. 378,326. (No model.)

*To all whom it may concern:*

Be it known that I, EMILE LIND, of Kansas City, Jackson county, Missouri, have invented certain new and useful Improvements in Cornstalk-Cutters, of which the following is a full, clear, and exact description, reference being had to the accompanying drawings, forming a part hereof.

My invention relates to an improvement in cornstalk-cutters; and it consists in the peculiar construction and combination of devices that will be more fully set forth hereinafter, and particularly pointed out in the claims.

Figure 1 is a perspective view of my invention, showing the way in general in which it is constructed. Fig. 2 is a sectional view of the same. Fig. 3 is a detail in perspective of the cutter-knife and cutter-frame, showing its peculiar construction, which will be more fully described farther on. Fig. 4 is a detail in perspective of the lever and the ratchet by means of which the cutter-knife is raised from and lowered to the ground, and at the same operation raises and lowers the small cog-wheel which throws the machine out of and into gear. Fig. 5 is a sectional plan view of the horizontal shaft which carries the small cog-wheel on one end of the pitman-wheel on the opposite end, showing the wrist to which the pitman-shaft is attached which operates the cutter-knives. Fig. 6 is a sectional view of one end of the cutter-frame, showing the position of one of the rods which is rigidly secured to the cutter-knives, the upper end of which passes loosely through the cross-beam to which the pitman-shaft is attached. It also shows the position of the hollow sleeve attached to the under side of the cross-beam at each end which the rod secured to the cutter-knife passes through loosely and extends to the top of the cross-beam, with a nut holding them in position.

34 is the ratchet-lever pivotally secured to the bracket, which is rigidly secured to the upright frame-work of the invention. At the lower end of said ratchet-bar is also rigidly secured segmental cogs, which mesh in with a series of cogs which are made integral with the main box which carries the horizontal shaft, so constructed that by means of the driver taking hold of the upper end of the lever the cutter-knife can be raised from the ground, at the same time throwing the cog-wheels out of gear.

35 is the dog-bar, which is held in position by a small spiral spring between two extended lugs on the rim of the bracket. When said dog-bars are in position at 36, the invention is in gear ready for operation. When dog-bar is thrown back and catches between cogs 38, the cutter-knife is raised from the ground and the cog-wheels raised out of gear.

31 is the inner portion of the bracket. 37 is the outer portion of the same.

32 is the pivotal point to which the segmental cogs are pivoted.

33 is the plate to which the segmental cogs are formed.

9 represents the cogs which are cast integral to the main boxing.

6 shows the position of the horizontal shaft where it passes through the main boxing.

7 is the box.

5 is a small cog-wheel, which meshes with a large cog-wheel that is rigidly secured to one of the wheels.

8 is an opening made through one of the uprights, through which the main box has an up-and-down movement when the machine is thrown in and out of gear.

46 is a foot-rest for the driver.

45 is a bracket rigidly secured to the uprights, holding the foot-rest in position.

4 is the cogged rim rigidly secured to one of the wheels.

14 is an opening of sufficient dimensions through the axle to admit the pitman-shaft to work.

15 is a casting rigidly secured to cross-beam, to which the lower end of the pitman is fulcrumed. 16 are openings through said castings, to which the end of said shaft is pivotally secured to the cross-beam which operates the cutter-knife.

20 is a cross-beam at the top of the upright post.

21 is the driver's seat.

17 is the cross-beam.

18 are slots made in the lower extended ends of the uprights in which the ends of the cross-beam are guided up and down.

11 is the pitman-wheel rigidly secured to one end of the horizontal shaft. 12 is a wrist secured to said pitman-wheel, to which the upper end of the pitman-shaft is attached.

7' is extended braces at each side of the main box, with their upper ends provided with loops through which horizontal shaft works loosely, on the outer sides of which are collars rigidly secured to the horizontal shaft by means of set-screws 11', which hold said shaft from working back and forth.

8' is a bolt which passes through the lower end of braces, holding them in position to the box.

23 is a sleeve which is rigidly secured to the under side of the cross-beam at each end, through which rod 24 passes. Also, around said sleeves is a spiral spring, (seen at Fig. 3,) of which its upper portion rests under cross-beam. Its lower portion rests on a cross-bar which is rigidly secured to the two upright rods 24. The object of said spiral springs is to admit of the cutter-knife having a rebounding motion in case it should strike a hard substance on the ground when in operation. At the same time the said springs are designed to have sufficient force to hold the knife in position while cutting cornstalks or other soft substances.

25 represents openings through the upright rods 24 at their lower portion, through which bolts are passed that hold the horizontal bar 29 in position.

26 is a loop at the lower portion of the upright rods rigidly secured to the cutter-knife. 27 is a bolt or rivet which holds it in position to the knife.

28 is the cutter-knife.

22 are nuts rigidly secured in position to the upright rods at the top of the cross-beam which holds said upright rods in their proper position.

If the cutter-knife should come in contact with a hard substance, the cross-beam forces the spiral-springs together, at the same time forcing itself down, so that the ends of the rods 24 extend above said beam 17.

40 are two straightening-hooks, one of which runs each side of the row of stalks with their points and sides sagging outward, and are loosely secured opposite to each other to the tongue. The object of said straightening-hooks is to gather the downlying stalks of corn in the track of the cutter-knife. Loosely looped to said straightening-hooks are secured two other rods, which form a junction at the top of the tongue and extend on an incline plane, to the upper end of which is loosely secured the ratchet-lever, so that when the machine is thrown out of gear and the cutter-knife is raised from the ground in the same operation the ends of the straightening-hooks are raised also from the ground.

41 represents the lower ends loosely secured to the straightening-hooks.

43 is the junction at the top of the tongue.

47 is the extended end of the ratchet-lever.

13 is the wheel to which the cog-rim is attached.

3 is the opposite wheel.

The object I have in view in the construction of this invention is to provide a stalk-cutter which will cut the cornstalks four to ten inches in length by changing the size of the small cog-wheel, leaving them in a condition whereby they can be easily turned under with an ordinary plow without choking, &c.

Having thus fully described my invention, what I claim as new, and desire protection in by Letters Patent of the United States, is—

1. In a stalk-cutter, the cutter-knives with a downward motion operated by means of two cog-wheels, the smaller one of which is rigidly secured to the horizontal shaft, the opposite end of said shaft provided with a pitman-wheel, to which is fulcrumed a pitman-shaft, said shaft passing through an opening in the axle-tree, the lower end of which is loosely secured to cross-beam, as fully set forth and described.

2. A cornstalk-cutter provided with two uprights, their lower ends provided with slots at their inner sides for the reception of the ends of the cross-beam 17, the upper end of one of said uprights provided with an elongated slot of sufficient dimensions to admit the box to move up and down when the invention is thrown in or out of gear, as fully set forth and described.

3. A cornstalk-cutter provided with a pitman-shaft fulcrumed at its upper and lower ends, the lower end to the cross-beam 17 and the upper end to the pitman-wheel 11, said cross-beam being provided with sleeves rigidly secured to its under side, said sleeves extending downward about one-half the distance between the cross-beam and cutter-knife, also provided with spiral springs which coil round said sleeves, extending from the under side of the cross-beam resting on crossbar 29, as fully set forth and described.

4. An improved cornstalk-harvester, comprising a vertical frame, an axle extending across the lower part of said frame, a pair of carrying-wheels mounted upon one of said axles, a gearing mounted upon one of said carrying-wheels, a revoluble shaft mounted movably in the upper part of the vertical frame and having at one end a gear-wheel meshing with the gear-wing upon the carrying-wheel, a cutter working in the lower part of the vertical frame, a pitman-wheel mounted on the inner end of the shaft, a pitman connecting the cutter with the pitman-wheel, a tongue connected at its inner end to the axle, a pair of gathering-rods pivoted upon the tongue, a ratchet-lever mounted upon the vertical frame, and a rod connecting the gathering-rods to the lever, substantially as set forth.

In testimony whereof I affix my signature in presence of two witnesses.

EMILE LIND.

Witnesses:
 GEO. G. THORPE,
 H. E. PRICE.